Sept. 4, 1951  C. C. CAREY  2,567,100
TRAILER FOR TRANSPORTING VEHICLES
Filed Oct. 15, 1949 6 Sheets-Sheet 1
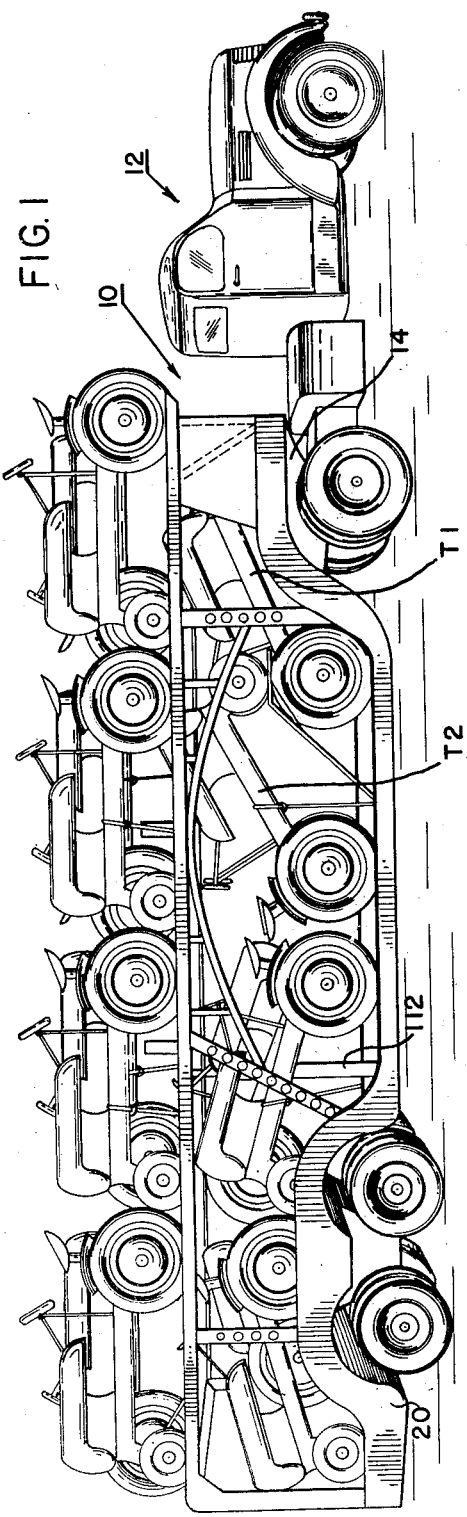
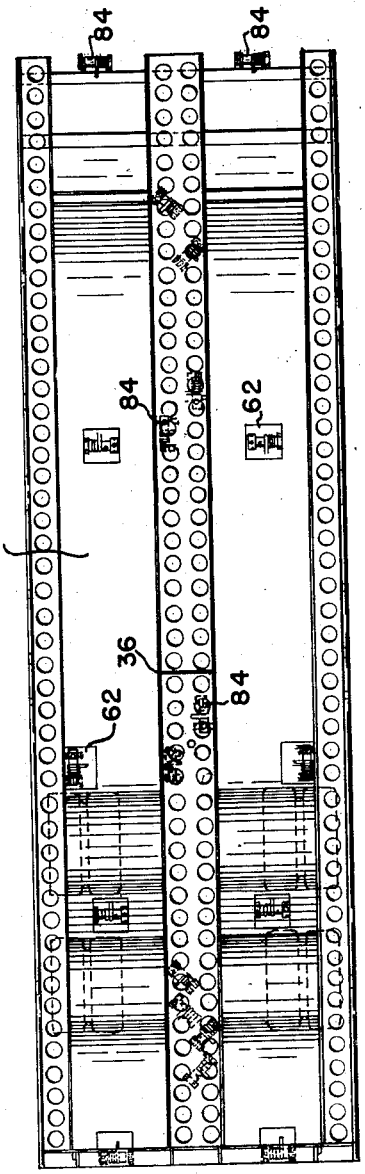
INVENTOR
CLINTON C. CAREY
By
*Toulmin & Toulmin*
ATTORNEYS Sept. 4, 1951 C. C. CAREY 2,567,100
TRAILER FOR TRANSPORTING VEHICLES
Filed Oct. 15, 1949 6 Sheets-Sheet 2
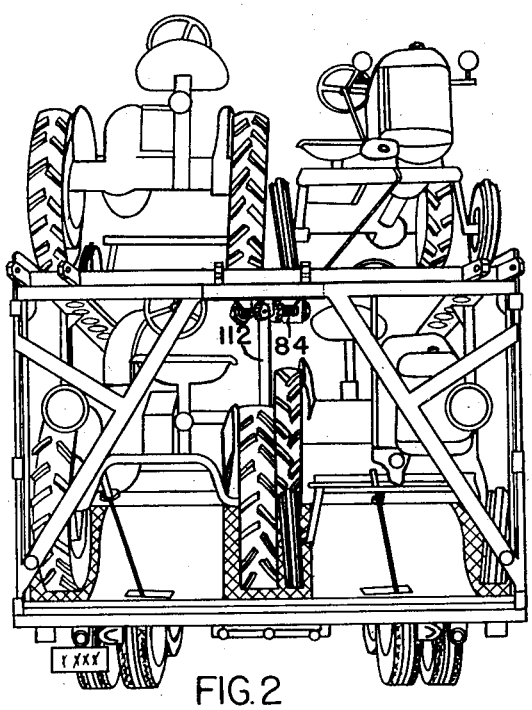
FIG. 2
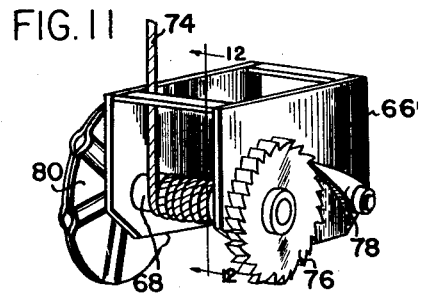
FIG. 11
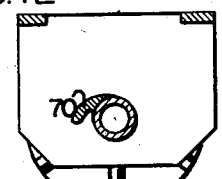
FIG. 12
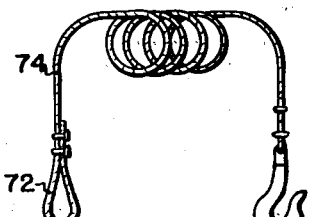
FIG. 13
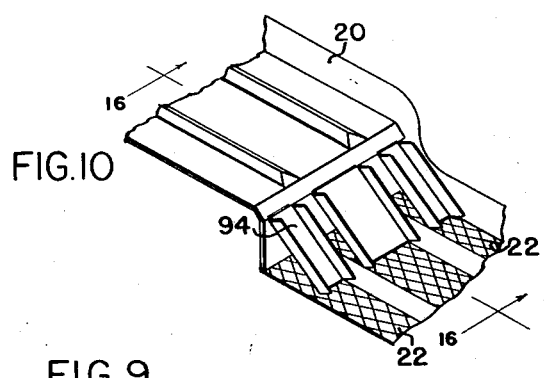
FIG. 10
FIG. 14
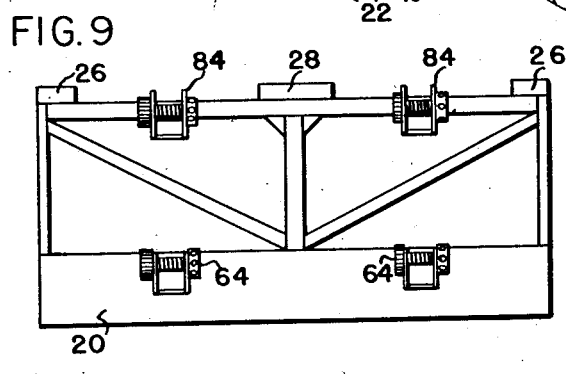
FIG. 9
INVENTOR
CLINTON C. CAREY
ATTORNEYS

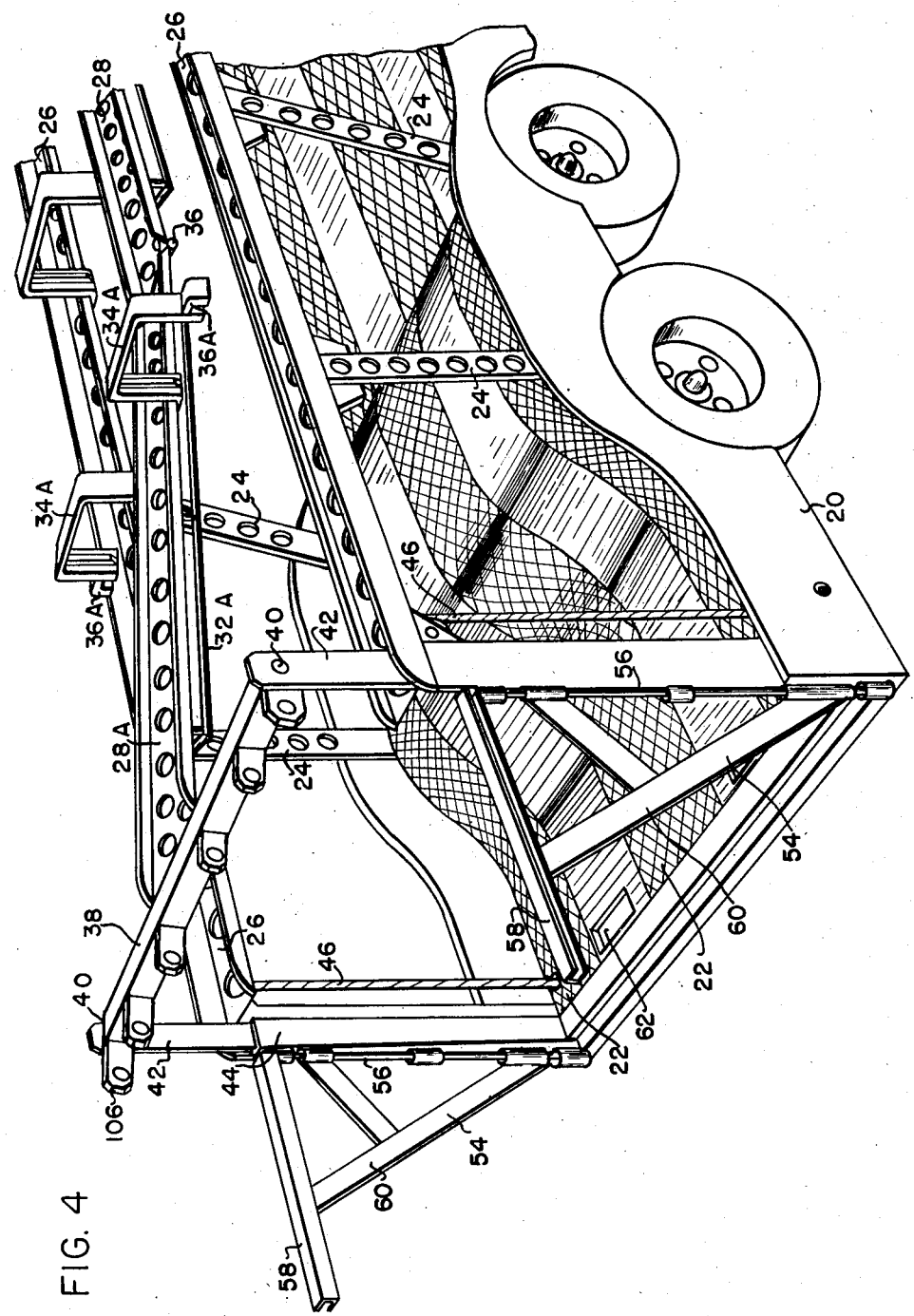

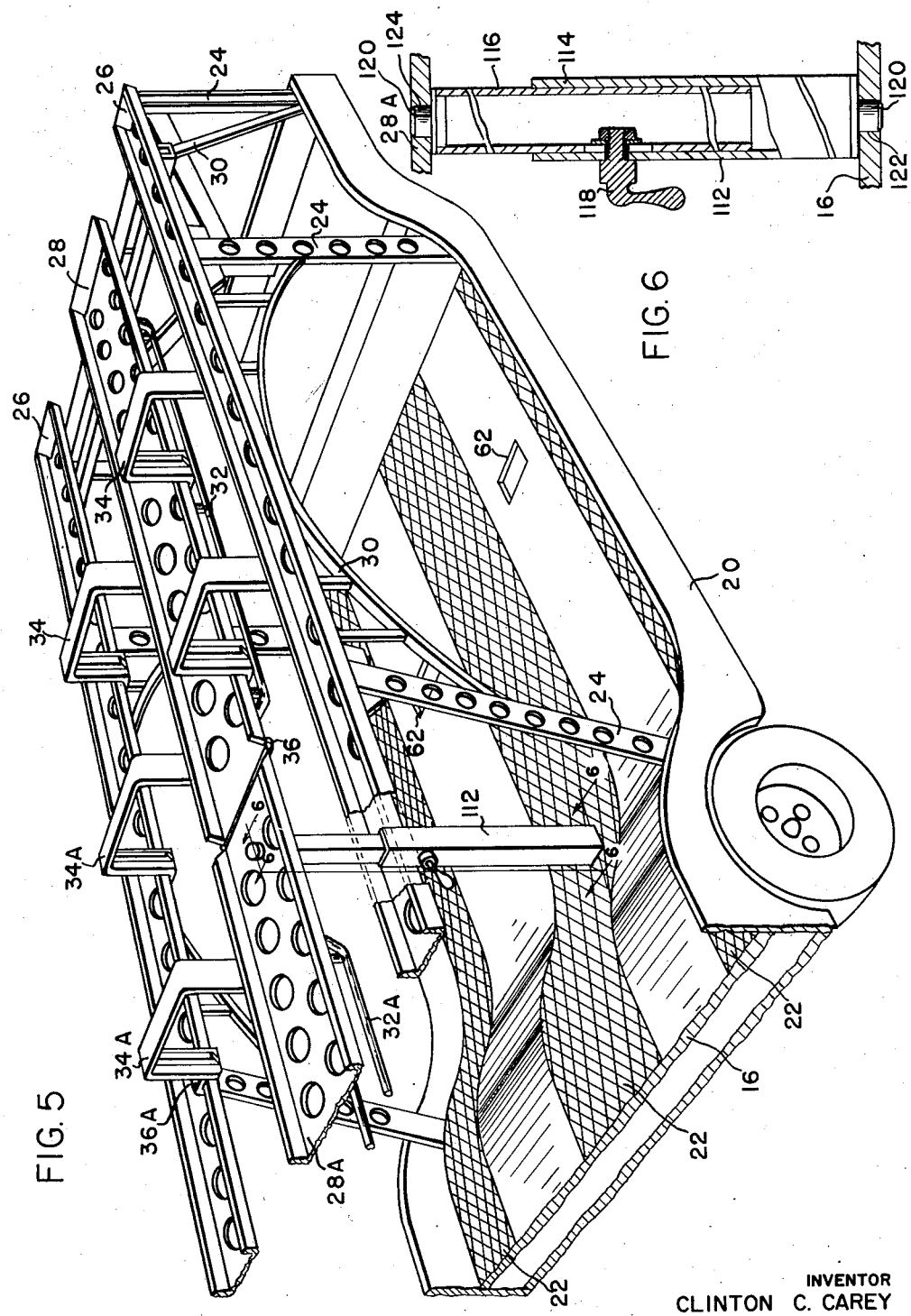

Sept. 4, 1951  C. C. CAREY  2,567,100
TRAILER FOR TRANSPORTING VEHICLES
Filed Oct. 15, 1949  6 Sheets-Sheet 5

INVENTOR
CLINTON C. CAREY
ATTORNEYS

Sept. 4, 1951             C. C. CAREY             2,567,100

TRAILER FOR TRANSPORTING VEHICLES

Filed Oct. 15, 1949                          6 Sheets-Sheet 6

INVENTOR
CLINTON C. CAREY
by
ATTORNEYS

Patented Sept. 4, 1951

2,567,100

UNITED STATES PATENT OFFICE 2,567,100

TRAILER FOR TRANSPORTING VEHICLES

Clinton C. Carey, Springfield, Ohio, assignor to Kenosha Auto Transport Co., Springfield, Ohio, a corporation of Ohio Application October 15, 1949, Serial No. 121,554

3 Claims. (Cl. 296—1)

This invention relates to trailers, and particularly to trailers of the type for transporting automobiles, tractors, and other vehicles.

A large industry has been built up in connection with the transporting of automobiles, tractors, and other vehicles by trailer from factories or assembly plants to distribution points, markets, or shipping locations. The trailers that are employed for this purpose ordinarily take the form of a tractor-trailer combination with the trailer being adapted for receiving two superimposed rows of vehicles, one on the lower deck of the trailer and the other on the upper deck of the trailer.

In connection with the shipping of tractors, trailers of this type have heretofore been quite wasteful of space because the tractors are somewhat smaller than automobiles, but are not so much smaller that two tractors can occupy the space of one automobile. Thus, a trailer which might satisfactorily transport eight automobiles of a certain size might only transport the same same number of tractors of a substantially smaller size.

Attempts to enlarge the size of the trailer in order to accommodate a greater number of vehicles have not been entirely successful because of the regulations of the various commerce and utility commissions which control traffic of this nature.

The present invention has particularly to do with a trailer arrangement of the nature referred to above which is adapted for carrying an unusually large number of vehicles, particularly tractors, but which meets all of the requirements of the above-identified commissions.

A particular object of this invention is to provide a trailer construction in which the space is utilized with a maximum of efficiency.

Another object is the provision of a trailer of the type referred to, and a method of placing vehicles on the trailer, such that the greatest possible number of vehicles can be carried by the trailer.

An ordinary railroad carload of tractors of the average size is sixteen tractors, and a particular object of this invention is to provide a trailer construction adapted for carrying one full carload lot of tractors, thereby making the transporting of the tractors from the factory or assembly plant to the railroad carrier a highly efficient operation.

Another particular object of this invention is a provision of an improved arrangement for holding the vehicles in place on the trailer so that they can be transported thereby without any danger of damage.

These and other objects and advantages will become more apparent upon reference to the following description taken in connection with the accompanying drawings, in which:

Figure 1 is a side elevational view of a tractor-trailer arrangement constructed according to my invention and with a full load of tractors thereon.

Figure 2 is a rear elevational view of the loaded trailer looking in from the left side of Figure 1.

Figure 3 is a plan view looking down on top of the trailer, but without any load thereon.

Figure 4 is a perspective view from the side of the trailer and toward the rear thereof showing the rearmost portion of the center track of the upper deck elevated to permit the vehicles to be driven into the trailer.

Figure 5 is a view similar to Figure 4, but showing the center and forward parts of the trailer.

Figure 6 is a vertical sectional view taken through a center post arrangement which is positioned adjacent the forward end of the tiltable center track of the upper deck to provide support therefor when the vehicle is loaded.

Figure 9 is a view looking in at the front end of the trailer immediately behind the cab of the tractor showing the construction thereof.

Figure 10 is a perspective view showing the appearance of the front end of the trailer immediately above the fifth wheel plate.

Figure 11 is a perspective view showing the construction of the reel and ratchet associated with one of the hold-down cables carried by the trailer.

Figure 12 is a sectional view indicated by line 12—12 on Figure 11.

Figure 13 is a view of a typical cable adapted for connection at one end with the reel of the devices of Figures 11 and 12 and, at its other end, with the vehicle to be held down.

Figure 14 is a perspective view showing how an auxiliary ramp is placed in the trailer for permitting one vehicle to be mounted pick-a-back on the one immediately in front of it.

Figure 16:
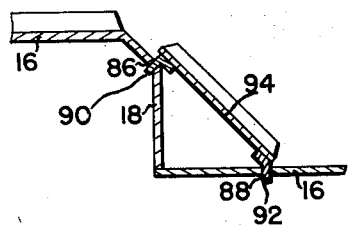
Figure 16 is a view of a smaller ramp than that shown in Figures 14 and 15 and which is utilized for the purpose of enabling the front wheels of the vehicles to be driven up on to the fifth wheel plate shown in Figure 10.

Referring to the drawings, the trailer of my invention is generally indicated at 10 and is shown in Figure 1, as connected with a tractor 12. According to usual and well known practices, the tractor and trailer are connected by a fifth wheel mechanism generally indicated as to location by reference numeral 14, but not disclosed in detail because such constructions are well known in the art and the particular one employed forms no part of the instant invention.

The trailer 10 comprises a lower deck provided by the steel floor plate 16, which is shaped to have a forward end overlying the fifth wheel, and an intermediate part which extends horizontally and backwardly at a level considerably below the forward portion, a portion extending over the back wheels and higher than the said intermediate portion, and a rearmost portion of substantially the same level as the same intermediate portion.

Figure 15:
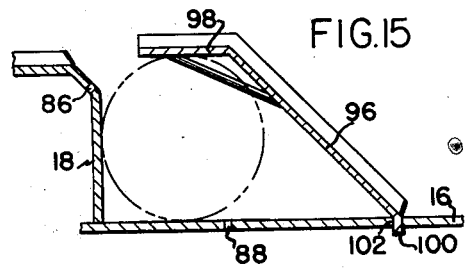
Figure 15 is a side view of the ramp construction of Figure 14.

In Figures 5, 15 and 16, it will be noted that the said floor plate 16 includes a substantially vertical part 18, connecting that part of the floor plate over the fifth wheel with the aforementioned intermediate part of the floor plate. It will be seen hereinafter that this vertical wall construction is availed of for utilizing the space in the trailer to a maximum degree.

The floor plate 16, preferably has side rails 20 extending upwardly therefrom down the sides of the trailer and across the front, as will best be seen in Figures 1, 4 and 5. Suitably formed anti-skid trackways 22 may also be provided on the floor plate 16, as will be seen in Figures 4 and 5 for receiving the wheels of the vehicles mounted in the trailer.

Upstanding from the sides and front of the floor plate of the trailer is a plurality of posts 24. These posts are utilized for supporting the upper deck of the trailer. The upper deck of the trailer consists of a pair of outer channel shaped tracks 26, which are located substantially vertically above the outermost tracks 22 of the lower deck of the trailer. The upper deck of the trailer also includes the center channel shaped track 28, and which is considerably wider than tracks 26 because it is to receive two vehicle wheels, side by side, instead of only one.

The outer tracks 26 are adequately supported by the posts 24 and the various trusses and braces indicated at 30 arranged between the posts and the tracks. In order to utilize the space within the trailer efficiently, no corresponding supporting structures can be provided for the center track 28. Accordingly, the center track 28 has fastened to the bottom thereof, the bridge truss arrangement indicated at 32, and which consists of steel tubing, or the like, welded or otherwise rigidly or permanently affixed to the under side of the track. Other brace members 34 are provided between the center track 28 and the outer tracks 26, and these take the form of the inverted U-shaped members, which will be seen in Figures 4 and 5. These members adequately support track 28, but by virtue of their inverted U-shape, still leave sufficient head room above the lower deck to permit easy loading thereon of the vehicles to be carried.

The center track 28 of the upper deck is hinged intermediate its ends, as at 36, so the rear end of the said track can be swung upwardly, as shown in Figure 4, and thereby providing a high access opening at the rear end of the trailer for driving vehicles through. This rear part of track 28, indicated at 28A, also has a supporting truss therebeneath, indicated at 32A, and the inverted U-shaped brace members 34A which correspond to the brace members 34 previously described, except that their engagement with the tracks 26 is by means of the slotted outer parts 36A on the said brace members. These slotted outer parts are adapted for fitting over the inner edges of tracks 26 when track part 28A is lowered and, thus, provides support for the said track part.

The rearmost end of track part 28A is connected with the transversely extending structural member 38 which may be a bar and/or channel, or any other suitable configuration having the necessary strength and rigidity. The outer ends of structural member 38 are pivoted, as at 40, to vertically extending bars 42 that telescope with the rear corner posts 44 of the trailer.

Figures 7, 8:
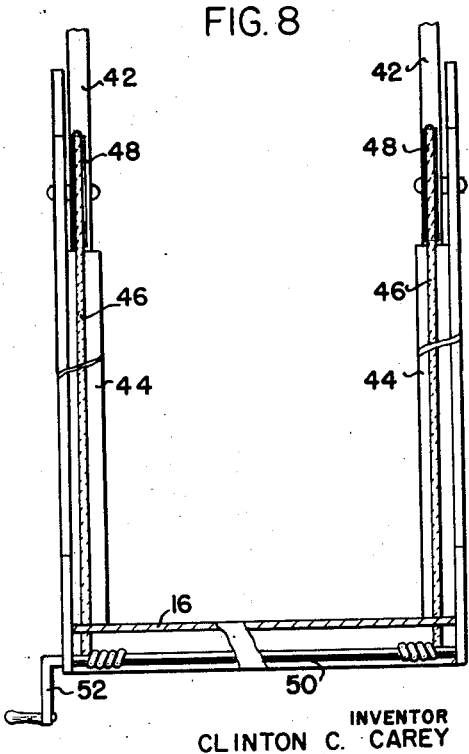
Figure 7 is a side view, partly broken away of one of the rear corner posts of the trailer showing the arrangement for elevating the rear part of the center track of the upper deck.
Figure 8 is a sectional view indicated by line 8—8 on Figure 7.

Turning to Figures 7 and 8, it will be seen that bars 42 have connected at their lower ends, the cables 46 that extend upwardly through the hollow posts 44 and over the pulleys 48 journalled adjacent the upper ends of said posts. After passing over the pulleys, the cables extend downwardly through floor plate 16 and are secured to a shaft 50 adapted for receiving a crank 52. It will be evident that rotation of shaft 50 by manipulation of crank 52 will be effective for raising or lowering bars 42, thereby to raise or lower structural element 38 and the track portion 28A. Suitable means of any well known type can be provided for latching shaft 50 in any predetermined position of adjustment.

Posts 44 also serve as supporting means for gates 54, which are hinged to the said posts as by the hinge pins 56, and which are adapted for being closed, as shown in Figure 2, and for being open, as shown in Figure 4. The gates comprise the upper channel parts 58 which are adapted for telescoping when the gates are closed so that bolts can be passed therethrough for bolting the gates closed. Preferably, the channel parts 58, when telescoped, provide a continuous rail extending across the back of the trailer immediately beneath transverse structural element 38 that supports the said element and thereby gives the necessary strength to the rear end of the upper deck for permitting the vehicles to be driven thereon.

The diagonal brace bars 60 of the gates assist in giving this desirable strength and rigidity, as will be evident in reference to Figure 2.

Spaced along the lower deck of the trailer are a plurality of hold-down cables and reels therefor. The cables and reels in the lower deck are mounted in the wells 62, which are distributed about the lower deck, as will be seen in Figure 3. In addition to the hold-downs provided in the wells 62, there are also a pair of hold-downs mounted on plate 20 at the front of the trailer, as indicated at 64 in Figure 9.

Each of the hold-downs referred to above is constructed substantially as illustrated in Figures 11, 12 and 13. In these figures, it will be noted that there is a frame part 66 through which extends a shaft 68 having a hook 70 for receiving the loop shown at 72 on the cable 74. One end of shaft 68 mounts a ratchet wheel 76 and on frame 66 is a pawl 78 for engagement with the ratchet wheel. The other end of the shaft mounts an actuating wheel 80, adapted for being operated by a bar for turning shaft 68 in the direction to wind up cable 74. Cable 74, at its end opposite loop 72, may comprise a hook 82 or any other suitable device for securing the cable to the vehicle to be held down thereby. The hook arrangement 82 permits the cable to be thrown about the axle or crankcase of a tractor, and the hook then engaged with the cable and the cable then drawn tight by turning of shaft 68.

The upper deck also comprises a plurality of similar hold-down devices and these have been indicated in Figure 3 by the reference number 84. These hold-downs are principally carried by track 28, and two are carried on the front end of the trailer immediately above the hold-downs 64 of the lower deck, as will be seen in Figure 9.

Referring now to Figure 1, it will be noted that the foremost vehicle on the lower deck of the trailer is arranged with its front wheels resting on the raised forward part of floor plate 16, while its rear wheels are resting on the intermediate part of floor plate 16 up against vertical part 18, which connects the said floor parts. This vehicle is indicated in Figure 1 at T1. For driving vehicle T1 into position, floor plate 16 is slotted, as shown in Figure 16 at 86 and 88, for receiving the angle clips 90 and 92 on the ends of a ramp member 94. Reference to Figure 10, in conjunction with Figure 16, will reveal that the ramps 94 are three in number with one at each side of the lower deck in alignment with the outer tracks 22 and the center one in alignment with the center track 28. The center ramp is, of course, of greater width than the outer ramps because it must be wide enough to receive two wheels. It will be evident that by use of the ramps 94, the vehicles can be driven onto the trailer so that their front wheels are disposed above the fifth wheel plate, while their rear wheels remain on the lower intermediate part of the floor plate.

Referring now to the second vehicle back from the front on the lower deck of Figure 1, and which is marked T2, it will be noted that this vehicle is arranged pick-a-back with vehicle T1 with its front wheels resting on the top of the rear wheels of vehicle T1. This is accomplished by means of the ramp 96, shown in Figure 15, and which has an upper horizontal part 98 adapted for resting on top of the rear wheel of vehicle T1, an inclined middle part, and a vertically downwardly extending part 100 adapted for being received in slot 102 in floor plate 16.

In placing the vehicles in position, the ramps 94 are first placed as shown in Figure 16, the vehicles are then driven forwardly far enough to get the front wheels thereof up on the forward raised part of the lower deck. The ramps 94 are then removed and the vehicles are driven further forwardly until their rear wheels abut vertical part 18 of the floor plate. The vehicle brakes may then be set, or the hold-downs associated therewith fastened to them. Thereafter, ramps 96 may be placed in position and the vehicles T2 driven in place.

Figure 17:
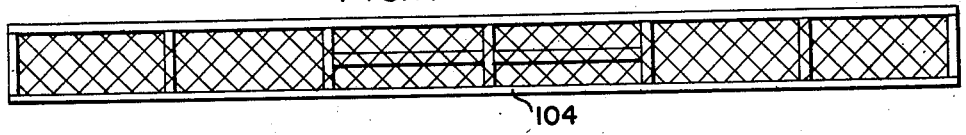
Figure 17 is a plan view of a ramp utilized for driving the vehicles on to the trailer.
Figure 18:
Figure 18 is a side view of the ramp of Figure 17.

For driving the vehicles onto the trailer, there are provided a plurality of light, portable ramp members 104 of the type illustrated in Figures 17 and 18. These ramp members are substantially conventional and are adapted for hooking on the back of the trailer with their rear ends resting on the ground, thus providing inclined tracks for the vehicles to be driven onto the trailer.

Figure 19:
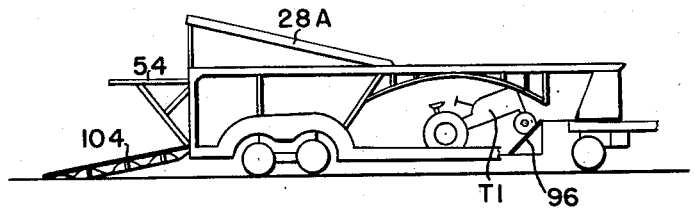
Figures 19 through 23 are diagrammatic views illustrating the steps carried out in accomplishing the loading of a trailer according to this invention.
Figure 20:
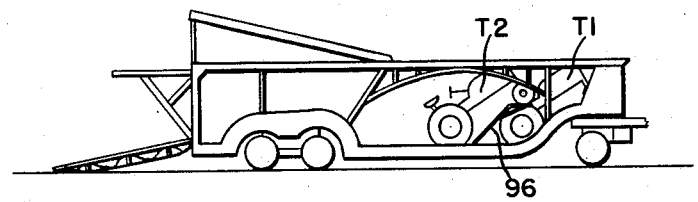

The complete loading of a trailer, according to this invention, is illustrated in Figures 19 through 23, and reference will now be made to these views. Referring first to Figure 19, it will be seen that track part 28A is elevated and gates 54 are swung open. This leaves the back end of the trailer wide open so that the vehicles can readily be driven therein. The ramps 104 are placed in position and the first vehicles, T1, are driven into place, as shown in Figure 1, and as already described. The width of the trailer is such that two vehicles T1 arranged side by side can be placed in position. Thereafter, the vehicles T2 are driven into their pick-a-back position, as already explained in connection with the description of the ramps 96.

The next vehicles to be driven on are indicated at T3, and these are backed onto the trailer on one side and driven onto the trailer forwardly on the other side. This combination of forward and backward permits the greatest use of available space of the trailer and, also, permits the insertion of a supporting post beneath track 28, as will be explained hereinafter.

Figure 21:
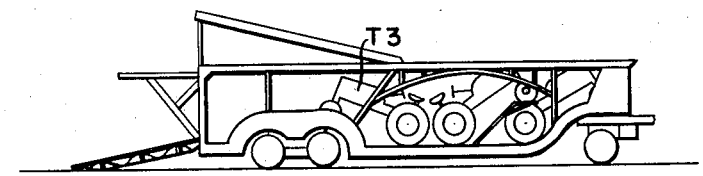
Figure 22:
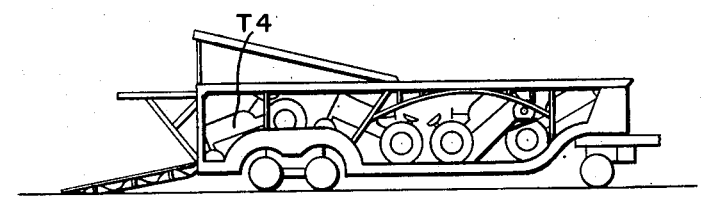

Figure 21 shows vehicle T3 in place, and Figure 22 shows vehicle T4 in place at the rearmost end of the lower deck.

After the lower deck has been completely filled as described above, the gates 54 are closed and bolted in place and track 28A is lowered to its lowermost position. The ramps 104 are then connected end to end with corresponding ramps 104 and forward ends of the combined ramps secured to the apertured lugs 106 projecting outwardly from structural element 38, as illustrated in Figure 4. Preferably, the several double ramps leading up to the tracks 26 and 28 are connected at their intermediate point with a single bar, in order to give greater rigidity to the ramp construction, and supporting posts 108 are provided which also engage this pin and have ground engaging pads 110 pivotally connected with their lower ends so that the intermediate portions of the combined ramp arrangements are adequately supported.

Figure 23:
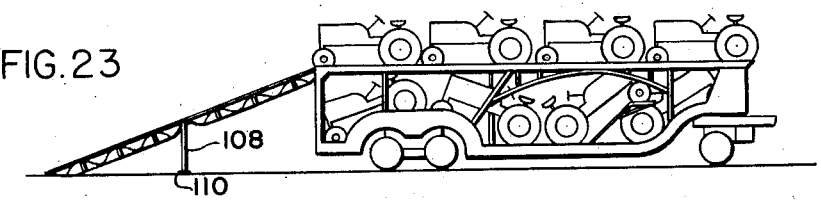

With gates 54 closed, the track portion 28A down and the ramps in position as shown in Figure 23, the upper deck of the trailer can be loaded by backing one row of tractors an and driving the other row on forwardly. Preferably, the upper deck is loaded by driving the vehicles on alternately first on one side and then on the other because, in this manner, the vehicles can be placed as close together as possible and may even, in certain cases, have their rear wheels in overlapping relationship.

After the upper deck is completely loaded, all the hold-downs are connected with the trailers and drawn tight, the ramp structure is dismantled and loaded onto the trailer and the entire loading operation is complete.

The unloading of the trailer, of course, takes place in the same manner as described above, except in reverse.

In order to make certain that the track 28 of the upper deck is adequately supported, there may be provided one or more adjustable post structure, as indicated in Figure 6. This post structure, identified at 112 comprises a pair of telescopic sections 114 and 116 adapted for being clamped together by bolt 118 and having projections 120 extending into a hole 122 in floor plate 16, into a hole 124 in track part 28A. It will be apparent that post 112 does not interfere with the raising and lowering movements of track part 28A, but at the same time, provides adequate support therefor. Also, post 112 can be removed during the loading operation on the lower deck of the trailer so as not to interfer with the movement of the vehicles thereon.

The particular vehicles shown in the drawings are tractors of a medium size having rather widely spaced rear wheels and closely spaced front wheels so that the alternate frontward and backward positioning of the tractors is of particular merit in connection therewith, but it will be understood that the principles of this invention are equally adaptable to all types of vehicles which are carried on trailers of the nature described.

It will be observed from the drawings that a complete load of tractors of the type illustrated are sixteen in number, and this constitutes one railroad carload so that the utmost in efficiency is observed in transporting the tractors from a factory or assembly plant to a railroad car.

The trailer arrangement is relatively inexpensive to construct, inasmuch as it comprises principally plates, bars, and the like which can readily be welded or bolted together to form a suitable strong and rigid structure. The overall dimensions of the trailer loaded or unloaded meet all requirements of highway and utility commissions and, thus, can be widely used for transporting vehicles in all parts of the country.

It will be understood that this invention is susceptible to modification in order to adapt it to different usages and conditions, and, accordingly, it is desired to comprehend such modifications within this invention as may fall within the scope of the appended claims.

I claim:

1. In a trailer for transporting vehicles; a lower deck having three laterally spaced wheel tracks thereon, framing upstanding from the sides of said lower deck including rear corner posts, an upper deck supported on said framing in vertically spaced relation to said lower deck and also comprising three laterally spaced wheel tracks, the center one of the tracks of the upper deck being hinged between its ends, a transversely extending member secured to the rear end of the said center track, bars pivoted to the ends of said member and extending downwardly into said corner posts, cables connected to the lower ends of said bars, and means acting through said cables for urging said bars upwardly to elevate the rear part of said center track.

2. In a trailer for transporting vehicles; a floor plate defining a lower deck, framing extending upwardly from the sides and front of said lower deck and including hollow columns at the rear corners of the trailer, an upper deck comprising outer tracks supported on the upper part of said framing, a center track on the upper deck supported on said outer tracks and hinged between its ends to permit raising of the rear end thereof, a transversely extending member connected to the rear end of said center track, vertically extending bars pivotally connected with the ends of said member and extending downwardly into said hollow columns, pulley means journaled in the upper ends of said columns, cables secured to the lower ends of said bars passing upwardly over said pulley means and then downwardly through said lower deck, and crank operated means mounted beneath said lower deck for reeling in said cables to raise the rear part of said center track.

3. In a trailer for transporting vehicles; a floor plate defining a lower deck, framing extending upwardly from the sides and front of said lower deck and including hollow columns at the rear corners of the trailer, an upper deck comprising outer tracks supported on the upper part of said framing, a center track on the upper deck supported on said outer tracks and hinged between its ends to permit raising of the rear end thereof, a transversely extending member connected to the rear end of said center track, vertically extending bars pivotally connected with the ends of said member and extending downwardly into said hollow columns, and means engaging said bars in said columns for actuating the bars vertically therein thereby to raise or lower the rear part of the center track.

CLINTON C. CAREY.

REFERENCES CITED

The following references are of record in the file of this patent:

UNITED STATES PATENTS

| Number | Name | Date |
|---|---|---|
| Re. 19,776 | Judd | Dec. 3, 1935 |
| 1,818,342 | McCrea | Aug. 11, 1931 |
| 2,169,648 | Judd | Aug. 15, 1939 |
| 2,492,980 | Garnett | Jan. 3, 1950 |